United States Patent
Iwata et al.

[11] 3,876,288
[45] Apr. 8, 1975

[54] LIGHT CONTROLLING DEVICE

[75] Inventors: Hiroshi Iwata, Osaka; Tetsuo Yamaoka, Settsu, both of Japan

[73] Assignee: West Electric Co., Ltd., Osaka, Japan

[22] Filed: Sept. 6, 1973

[21] Appl. No.: 394,626

[30] Foreign Application Priority Data
Sept. 8, 1972  Japan............................... 47-90835
Oct. 16, 1972  Japan............................... 47-103316
Oct. 16, 1972  Japan............................... 47-103317
Oct. 16, 1972  Japan............................... 47-103318
Dec. 20, 1972  Japan............................... 47-128512
Dec. 20, 1972  Japan............................... 47-128513
Dec. 20, 1972  Japan............................... 47-128514

[52] U.S. Cl............. 350/160 R; 350/179; 350/266; 350/267; 354/227
[51] Int. Cl. ............................................. G02f 1/30
[58] Field of Search........ 350/160 R, 179, 266, 267; 354/50, 60, 29, 226, 227

[56] References Cited
UNITED STATES PATENTS

| | | | |
|---|---|---|---|
| 3,322,482 | 5/1967 | Harmon................................ | 350/267 |
| 3,328,110 | 6/1967 | Berger et al. .................... | 350/160 R |
| 3,512,876 | 5/1970 | Marks............................... | 350/160 R |
| 3,648,269 | 3/1972 | Rosenweig et al.............. | 350/267 X |

*Primary Examiner*—Ronald L. Wibert
*Assistant Examiner*—Paul K. Godwin
*Attorney, Agent, or Firm*—Stevens, Davis, Miller & Mosher

[57] ABSTRACT

A light controlling device comprising a magnetic colloidal fluid formed of a mixture of pulverized active magnetic material consisting of a magnetic metal such as nickel, cobalt, iron, etc. or an iron oxide and oleic acid, heptane, etc. sealed in a vessel with a transparent material such as glycerin, silicone oil, etc. A magnetic field can be applied from the outside of said vessel to control the position of said magnetic fluid. Thereby, the device may serve as a light shutter or diaphragm.

18 Claims, 33 Drawing Figures

LIGHT CONTROLLING DEVICE

Background of the Invention

1. Field of the Invention

This invention relates to a novel light controlling device, and more particularly to a light controlling device comprising a sealed vessel containing a magnetic colloidal fluid formed of a mixture of finely pulverized active magnetic material and a solvent, and a transparent liquid.

2. Description of the Prior Art

There are various optical shutters which are activated non-mechanically; those utilizing the electro-optic Kerr effect (induction of birefringence by an electric field), the Faraday effect (rotation of the plane of polarization by a magnetic field), etc., those utilizing a liquid crystal plate, for example a nematic type liquid crystal, etc. Namely, in a device utilizing the Faraday effect, a material capable of rotating the plane of polarization of a linearly polarized light wave is sandwiched by a pair of linear polarizers, i.e., a polarizer and an analyser. An incident light wave is transformed into a linearly polarized light by the first polarizer. Then, the plane of polarization is rotated through the material of the Faraday rotation imparted with a magnetic field. This rotation of the plane of polarization can be transformed into a change in the transmission through the second polarizer, i.e., the analyser. In the device utilizing a liquid crystal plate, the orientation of the molecules of an organic material can be dispersed by the application of an external electric field to cause light scattering (the material being transparent in the absence of an external field changes to be opaque). Thus, the transmission of the light wave can be controlled by the external field.

In the former case of rotating the plane of polarization, however, a pair of linear polarizers should be provided on the both sides of the dielectric material. Therefore, the intensity of the incident light wave is reduced inevitably by the first polarizer. This loss of the intensity of the incident light wave is one of the large disadvantages for the use in combination with an optical device such as a photographic camera in which much effort has been paid to raise the brightness of the lens, i.e., the transmission of the lens. Further, means for generating an electric or magnetic field to be applied on the dielectric material becomes very large. Thus, the use of such device in combination with a portable device is not practical.

In the latter case of utilizing a nematic type liquid crystal phenomenon, the liquid crystal is normally transparent and becomes opaque when an electric field is applied. For the use as a shutter, normally opaque state is required. In the case of a liquid crystal plate, an electric field should be applied normally and hence the power consumption becomes large. Thus, practical use is impossible Further, whichever electro-optic phenomenon is utilized, the polarizing property is accompanied with a wavelength dependency in the relation between the incident and the exit light waves. Thus, the perfect cut-off of a light wave and the perfectly flat transmission characteristics are hardly available.

SUMMARY OF THE INVENTION

An object of this invention is to provide a novel light controlling device comprising a magnetic colloidal fluid suspended in a transparent medium, the position of said magnetic fluid being controlled by the magnitude of the magnetic field.

According to this invention, the movement of the magnetic fluid is directly controlled by an electric circuit. Therefore, when the present device is applied in a photographic camera, the amount of exposure can be controlled by an electric circuit without any need for the mechanically adjustable portion for focusing. Thereby, the action speed can be made rapid and the control can be done with a small energy supply. Further, the durability of the final product can be increased.

BRIEF DESCRIPTION OF THE INVENTION

Other objects, features and advantages of this invention will be best understood from the following detailed description when read in conjunction with the accompanying drawings.

DESCRIPTION OF THE PREFERRED EMBODIMENTS

First, preceding the description of the present embodiment, the magnetic fluid disclosed in U.S. Pat. No. 3,215,572 will be briefly described.

A magnetic colloidal liquid can be formed by powdering an active magnetic material consisting of a magnetic metal such as nickel, cobalt, iron, etc., or an iron oxide in a ball mill of stainless steel, etc. to the grains of the order of 0.06 and 0.24 $\mu m$ $\phi$ and mixing the powder with a medium formed of oleic acid, heptane, etc. In this colloidal fluid, the powdered magnetic material disperses appropriately in the medium. Such a magnetic fluid exhibits response to a magnetic field by itself.

When such a magnetic fluid is sealed in a vessel together with a different but transparent liquid base such as water, glycerine, or silicone oil at an appropriate volume ratio, the magnetic fluid does not mix with the liquid base and is suspended in the liquid base. When an appropriate external magnetic field is applied, the magnetic fluid can be easily controlled in its position.

Then, the principles of displacement of the magnetic fluid and the transparent material in a sealed vessel by a current supply through an electromagnetic coil will be described.

Figure 1:
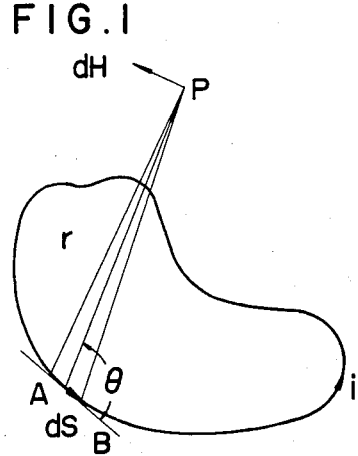
FIG. 1 is a schematic diagram illustrating the magnetic interaction

In FIG. 1, a current i flows through a singly wound loop. The magnetic field dH due to the current i through a minute portion ds generated at a point P separated from the portion ds by a distance r is expressed by the Biot-Savart's law as $$dH = (\sin \theta \cdot i / 4\pi r^2) \cdot ds$$

where $\theta$ is the angle between the line $ds$ and the line connecting the point $P$ and the portion $ds$. The direction of the magnetic field dH is perpendicular to the plane including the line $ds$ and the point $P$ in the sense according to the right hand screw. Thus, the intensity of the magnetic field H at an arbitrary point due to a singly wound coil can be expressed as $$H = \int_0^{2\pi r} dH = \int_0^{2\pi r} \frac{\sin \theta \cdot i}{4\pi r^2} ds$$

(if the number of turns is $N$, the intensity is $N$ times large).

A magnetic body located at $P$ and subjected to a magnetic field $H$ is acted with a moment to direct the magnetic moment parallel to the direction of the magnetic field $H$ and with an attraction proportional to the square of the magnetic flux. Further, the larger is the magnetic permeability of the body, the more easily is moved the body to the coil.

Now, embodiments of the light controlling device for use as a shutter or diaphragm according to the present invention based on the principle illustrated in FIG. 1 will be described hereinbelow.

Figure 2:
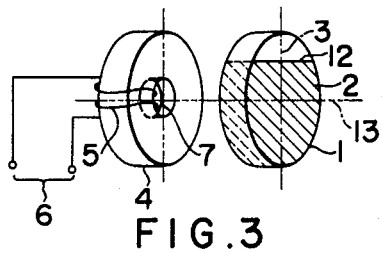
FIGS. 2 to 4 show embodiment of this invention.
Figure 3:
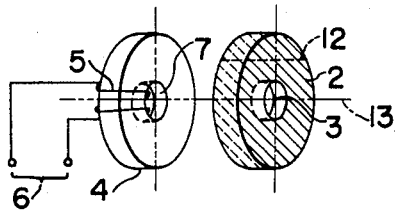
Figure 4:
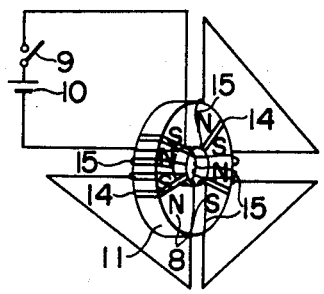

FIGS. 2, 3 and 4 illustrate an embodiment of this invention. In FIG. 2, a transparent hermetic vessel 1 seals a magnetic fluid 2 and a transparent material 3. An electromagnet 4 is disposed at the back of the transparent vessel 1. The electromagnet 4 has an aperture 7 for transmitting a light ray at the center of the core. When a current is supplied to terminals 6 of an electromagnetic coil 5, the electromagnet 4 is magnetized by the coil 5. Then, the magnetic fluid 2 in the transparent vessel 1 is moved and fixed around the magnetic poles generated by the electromagnet 4. In the aperture 7 of the electromagnet 4, since no magnetic flux is generated, the transparent liquid 3 moves into the portion near the area 7 in place of the magnetic fluid 2 and is fixed at the central portion of the vessel 1.

Hence in FIGS. 2 and 3, the electromagnet 4 is shown as a single magnet for the simpliclity of the illustration. In practice, however, the state of the magnetic fluid 2 in FIG. 3 is realized through an arrangement as shown in FIG. 4. Namely, the core of the electromagnet 4 is split into multiple portions 11 separated by nonmagnetic material 14 and a coil is wound on the whole surface of each of the split cores to generate a multiplicity of poles 8. Then, the state of the magnetic fluid 2 can be changed from one shown in FIG. 2 to another shown in FIG. 3.

This invention is based on the above action. Namely, when the light ray is injected along the central line shown in a dotted broken line 13, the state of FIG. 2 represents the light-cutting-off state and that of FIG. 3 represents the transparent state. Thus, the device can have a function equivalent to a lens shutter in a photographic camera.

Further, another feature of this invention lies in the selection of different specific weight for the magnetic fluid 2 and the transparent liquid 3. Therefore, the magnetic fluid 2 condense in one direction of the transparent vessel. The volume ratio of the magnetic fluid 2 to the transparent liquid 3 is so selected that the interface 12 in the normal state is located above the upper edge of the interface in the magnetically activated state shown in FIG. 3. The aperture of the electromagnet (or the incident aperture) is selected smaller than the transparent liquid 3 in the state of FIG. 3. Then, FIG. 3 represents the most transparent state and FIG. 2 represents the perfectly cut-off state. If the perfect cut-off of the light ray is not necessary, the selection of the volume ratio of the magnetic liquid to the transparent liquid extends to lower values.

Since the cut-off state as shown in FIG. 2 is formed by the gravity of the magnetic fluid 2, there is not need for an external power supply for maintaining the cut-off state. It may seem that since the position of the magnetic fluid 2 changes relative to the direction of the hermetic vessel 1, the cut-off state may be broken by the movement of the vessel 1. In reality, however, although the interface of the two liquids changes by the movement of the vessel 1, the magnetic fluid 2 always coheres in a lower portion by its gravity and the transparent liquid 3 can never concentrate in the central portion unless the electromagnet 4 is energized. Thus, the light ray incident along the line 13 can never penetrate through the vessel 1 in the cut-off state. Namely, the perfectly opaque state can be formed irrespective of the orientation of the vessel by appropriately selecting the volume ratio. This can be said throughout the embodiments.

Figure 5:
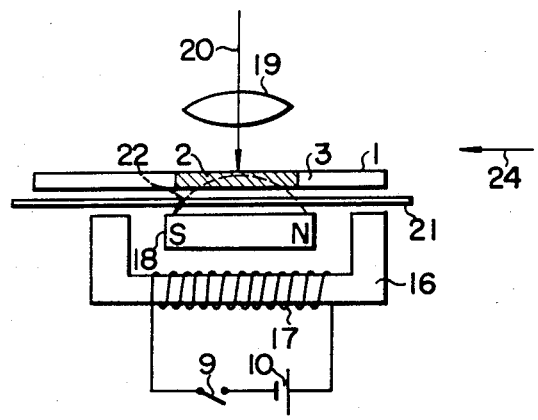
FIGS. 5 and 6 are cross-sectional diagrams showing another embodiment.
Figure 6:
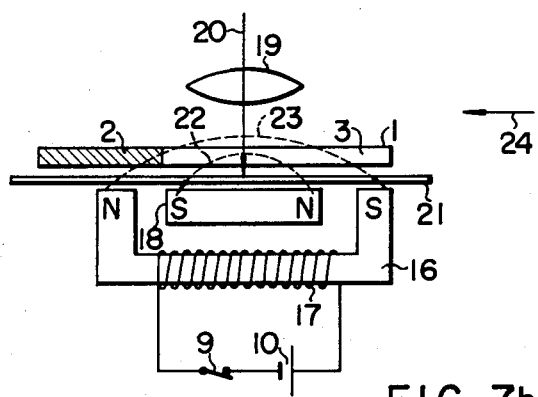

FIGS. 5 and 6 show another embodiment of the light controlling device utilizing a combination of a magnetic circuit and a magnetic fluid. A transparent hermetic vessel 1 seals a magnetic fluid 2 and a transparent liquid 3 at an appropriate volume ratio. The transparent vessel 1 is disposed in front of an electromagnet formed by winding a coil 17 on a core 16. Further, a permanent magnet 18 is disposed inside the electromagnet in the polarity as shown in the figures. The current from a d.c. source through the coil 17 is controlled by a switch 9.

When the switch 9 is open, the electromagnet is not energized and hence generates no magnetic flux around the core 16. Then, the magnetic fluid 2 is attracted by the magnetic flux from the permanent magnet 18 and concentrates in the central portion. Thus, a light ray 20 transmitted through a lens 19 is interrupted by the magnetic fluid 2 and does not reach a photosensitive sheet 21.

When the switch 9 is turned on to allow a current to flow through the coil 17 as shown in FIG. 6, a magnetic flux 23 generated by the coil 17 cancels the magnetic flux 22 in the vessel 1. If the direction of the gravity is along an arrow 24, the magnetic fluid 2 is moved along the arrow 24 to an edge portion. Thus, a light ray 20 transmitted through a lens 19 injects on a photosensitive sheet 21 such as a photographic film. Thus, the exposure of the photosensitive sheet such as a photographic film can be controlled by switching the current to the coil.

Figure 7A:
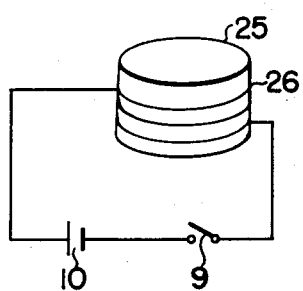
FIGS. 7a, 7b and 7c are schematic cross-sectional diagrams showing another embodiment.
Figure 7B:
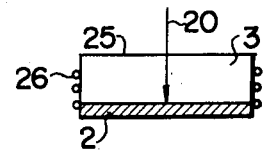
Figure 7C:
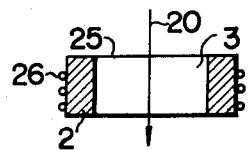

FIG. 7a, 7b and 7c show another embodiment for controlling the transmission of light, in which an electromagnetic coil 26 is wound around a transparent vessel 25. The current from a d.c. source to the coil 26 is controlled by a switch 9.

When the switch 9 is open, no magnetic flux is generated and the magnetic fluid 2 receives no magnetic attraction and remains still. Thus, the incident light ray 20 is interrupted by the magnetic fluid 2 and does not transmit through the vessel 25.

When the switch 9 is turned on to allow a current to flow through the magnetic coil 26, a magnetic flux is generated and the magnetic fluid 2 in the transparent vessel 25 receives a magnetic interaction by said Biot-Savart's law. Further, the magnetic fluid 2 is attracted to the peripheral portion by experiments as is shown in FIG. 7c and the light ray 20 can transmit through the central portion of the vessel 25, although a simple calculation yields a uniform field inside the coil.

When the switch 9 is turned off to stop the current supply, the magnetic fluid 2 extends uniformly by the gravitational force and returns to the stationary state as shown in FIG. 7b to cut off the light again.

Figure 8A:
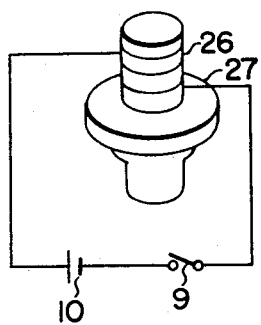
FIGS. 8a, 8b and 8c are schematic and cross-sectional diagrams showing another embodiment.
Figure 8B:
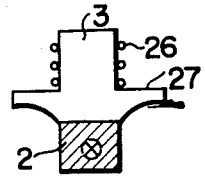
Figure 8C:
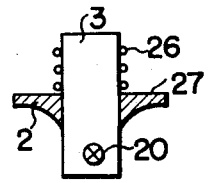

Further embodimennt of an optical shutter is shown in FIGS. 8a, 8b and 8c, in which the basic structure is the same as those of the preceding embodiment. The shutter device comprises an opaque magnetic fluid 2, a transparent material 3 such as a liquid paraffin, a transparent vessel 27 sealing the magnetic fluid 2 and the transparent vessel 27, an electromagnetic coil 26, a current source 10 and a switch 9. The transparent vessel 27 has a radially enlarged portion.

when the switch 9 is turned off, no energy is supplied from the current source 10 and a light ray 20 is perfectly absorbed by the magnetic fluid 2 in the vessel 27 which serves as an optical shutter and no light transmits through the vessel 27 as is shown in FIG. 8b.

Next, when the switch 9 is turned on, a current loop is formed of the current source 10 and the electromagnetic coil 26 to generate a magnetic flux. Then, the magnetic fluid 2 sealed in the vessel 27 is moved into the projecting portion located at an end of the winding 26 so that the light ray 20 can transmit through the transparent material 3 which occupies the central portion.

When the controlling switch 9 is turned off after an appropriate time, the energy supply from the current source 10 is stopped and the magnetic fluid 2 attracted to the projecting portion is subjected only to a gravitational force and returns to the stationary light shielding state.

Figure 9:
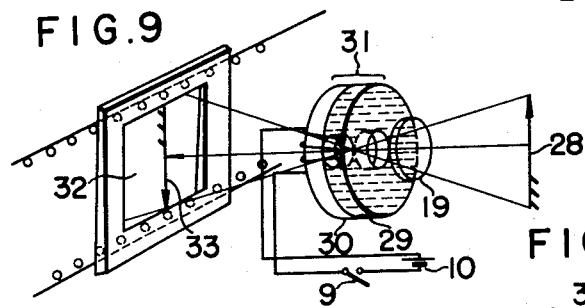
FIG. 9 is a schematic diagram showing how the present device is embodied in a photographic camera.

FIG. 9 shows an application of the present device in a photographic camera. An image 33 of an object 28 is formed on a photographic film 32 through a lens 19 and a light controlling device 31 comprising a sealed transparent vessel 29 containing a magnetic fluid 2 and a transparent material 3 and an electromagnet 30. An appropriate exposure time adapted for the sensitivity of the film 32 is given by closing the switch 9 for an appropriate time.

FIG. 10 shows another structure, in which a magnetic fluid 2 and a transparent material 3 formed of water, silicone oil, glycerine, etc., are sealed in a transparent hermetic vessel 34 and an annular electromagnet 37 consisting of coils 15 and cores 36 and having a vacant space 35 is disposed contiguous to and behind the transparent hermetic vessel 34. The aperture 35 of the electromagnet serves as a diaphragm. When the electromagnet 37 is energized, the core 36 is magnetized as is shown in the FIGURE and the magnetic fluid 2 is moved to the peripheral portion as is shown in the FIGURE. Then the transparent material 3 is fixed at a central lens-forming portion 38 which has a concave shape.

Figure 11A:
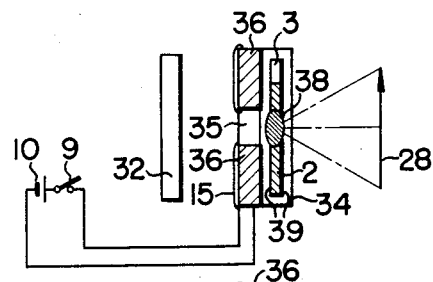
Figure 11B:
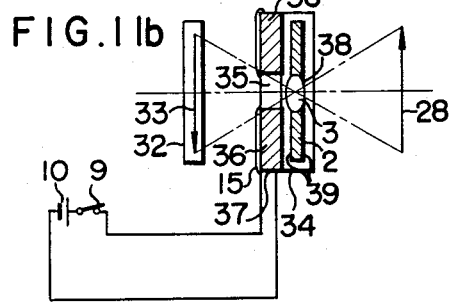

The above structure and action are more clearly shown in FIGS. 11a and 11b. A magnetic circuit for energizing an electromagnet 37 is formed of a current source 10, a switch 9 and a coil 15. When the switch 9 is open, the magnetic fluid 2 settles below by its gravity as is shown in FIG. 11a. Thus, the central portion of the transparent vessel 34 does not transmit any light. When the switch 9 is closed, the electromagnet 37 is energized to attract the magnetic fluid 2 to a peripheral portion as is shown in FIG. 11b. Then, a light ray can transmit through the central portion.

When the central portion of the inner wall 39 of the transparent vessel 34 of FIG. 10 is formed in a concave shape as is clearly shown in FIGS. 11a and 11b, the transparent material 3 fixed at the central portion of the transparent vessel 34 by the activation of the magnet 37 (FIG. 11b) becomes to be a lens. A photographic camera can be formed by arranging a photosensitive sheet 32 such as a photographic film behind the lens portion 38 to focus the image 33 of an object 28 on the photographic film. This lens also serves as an optical shutter. Thus, a unique device having a composite function can be provided.

Figure 10A:
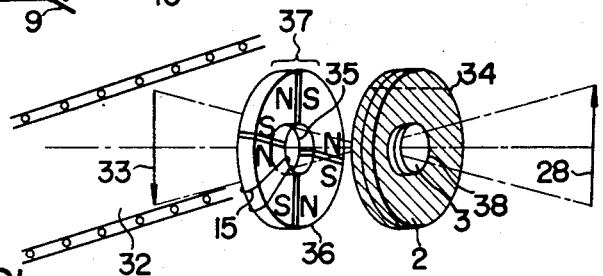
FIGS. 10a, 11a and 11b are schematic and cross-sectional diagrams showing another embodiment.
Figure 10B:
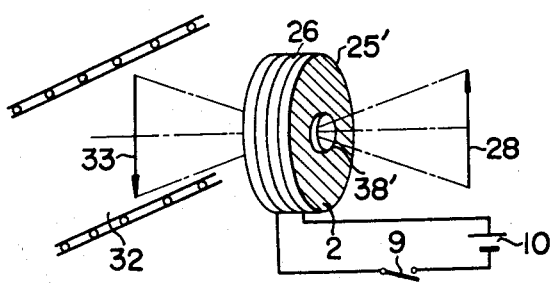
FIG. 10b shows another embodiment.

FIG. 10b shows a structure in which a lens-forming portion 38' is formed in the transparent vessel 25 of FIG. 7a and a coil 26 is wound around the transparent vessel 25' to provide a similar function as that of FIG. 10a.

Figure 12:
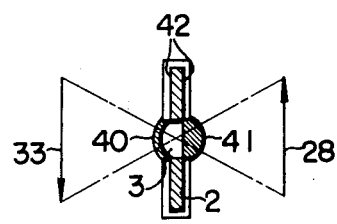
FIG. 12 is a cross-sectional showing further embodiment.

Further, the spherical aberration of a single lens can be compensated easily by combining several kinds of lenses. For example, as is shown in FIG. 12, the central portion of the wall of the transparent vessel may be formed into concave lenses 40 and 41 and the inner wall 42 of the vessel may be formed into another concave lens shape.

Figures 13, 14A, 14B, 14C:
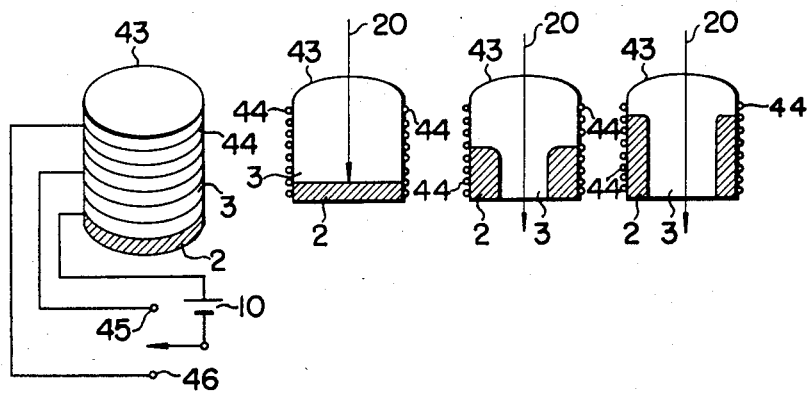
FIGS. 13, 14a, 14b and 14c are schematic and cross-sectional diagrams showing another embodiment.

FIG. 13 shows another embodiment of this invention in which the area of light transmission (radius of the diaphragm) can be changed. In the FIGURE, certain amounts of a magnetic fluid 2 and a transparent material are sealed in a transparent vessel 43. A coil 44 is wound around the periphery of the vessel uniformly. Several taps 45, 46 are provided to the coil 44 at predetermined turns to determine the radius of the diaphragm. A current source 10 can be selectively connected to one of the taps.

In the device of such structure, when no current is allowed to flow through the coil 44, the magnetic fluid 2 remains to be positioned in the lower position. When the switch is changed to an intermediate tap 45, a magnetic flux is generated by a portion of the coil 44 and the magnetic fluid 2 is attracted to a lower peripheral portion to transmit the indicent light 20 near the optical axis as is shown in FIG. 14b. When the switch is further changed over to the tap 46, a larger portion of the coil 44 is energized and the aperture for transmitting light 20 becomes wider than FIG. 14b, as is shown in FIG. 14c. Thus, the radius of the diaphragm can be changed by changing the current supply from the current source 10 according to the external environment.

FIGS. 15a to 15d show embodiments for controlling the exposure time for a photosensitive material 21 such as a photographic film in the device as shown in FIGS. 5 and 6. In the figures, numeral 48 represents a magnetic circuit including the core 16 and the coil 17 and disposed near the transparent vessel 1 sealing the magnetic fluid 2 and the transparent liquid 3. The exposure time for supplying light energy to the photosensitive sheet 21 such as a photographic film is determined by the energy stored in a capacitor 47.

If an SCR 49 connected to the magnetic circuit 48 in series is triggered in the state when the capacitor 47 is changed up by a d.c. 10 through a resistor, the charge stored in the capacitor 47 discharges through the magnetic circuit 48 and generates a magnetic flux in the core 16.

Figure 16:
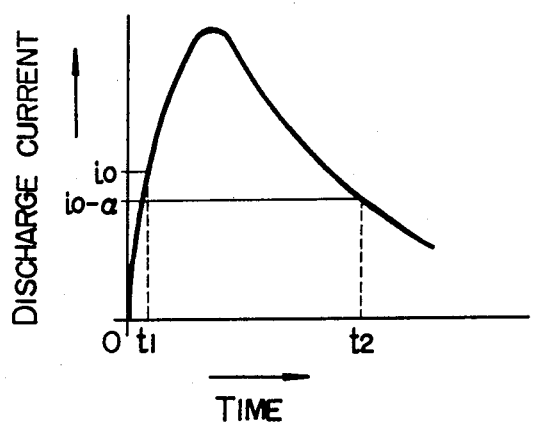
FIG. 16 shows the profile of the discharging current.

The magnetic flux increases with the increase of the discharging current. As is shown in FIG. 16, when the current reaches $i_0$ at time $t_1$, the magnetic flux generated by the electromagnet cancels the magnetic flux 22 established by the permanent magnet 18 and the magnetic fluid 2 is moved down by the gravitational force to allow a light energy having been interrupted by the magnetic fluid 2 to impinge upon the photosensitive sheet 21 such as a photographic film. Exposure is done only in the period when the discharging current due to the charge stored in the capacitor 47 exceeds the value $i_0$. When the discharging current becomes $i_0 - \alpha$ ($\alpha$ is a value determined by the gravity of the magnetic fluid, hysteresis of the magnetic circuit, etc.) at time $t_2$, the magnetic flux generated in the core 16 in the magnetic circuit 48 becomes insufficient to cancel the magnetic flux 22 of the permanent magnet 18 and the magnetic fluid 2 is pulled back again by the magnetic flux 22 of the permanent magnet 18 to shield the photosensitive sheet 21 from the light.

Figure 17:
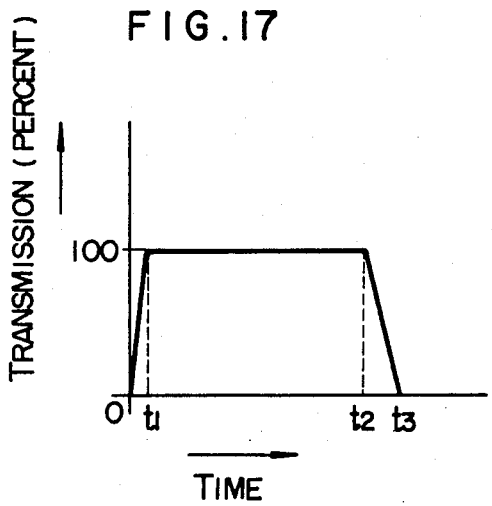
FIG. 17 shows the profile of the exposure.

FIG. 17 shows the exposure state of the photosensitive sheet 21 due to the movement of the magnetic fluid by the magnitude of the magnetic flux established by the magnetic circuit 48. Namely, the ordinate represents the transmission of light through the device normalized by the maximum transmission and the abscissa represents time. When the discharging current from the capacitor 47 reaches $i_0$, the magnetic fluid 2 is perfectly removed from the light path and the photosensitive sheet is exposed to the maximum degree.

In the period while the discharging current from the capacitor 47 is above $i_0$, the photosensitive sheet 21 is fully exposed to the incident light. When the current reduces to $i_0 - \alpha$ at time $t_2$, the magnetic fluid 2 begins to be gradually pulled back by the permanent magnet 18 and the transmission gradually decreases. At time $t_3$, the transmission reduces to zero.

Figure 15A:
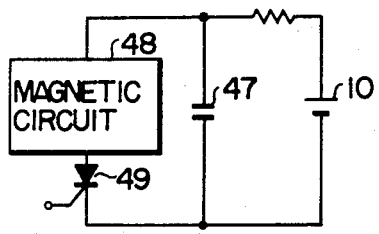
FIGS. 15a, 15b, 15c and 15d are circuit diagrams for controlling the exposure in the present device.
Figure 15B:
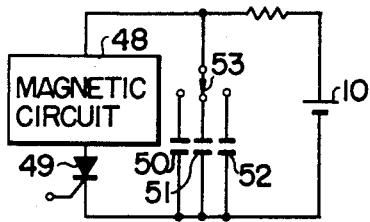
Figure 15C:
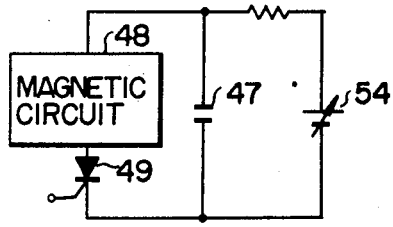
Figure 15D:
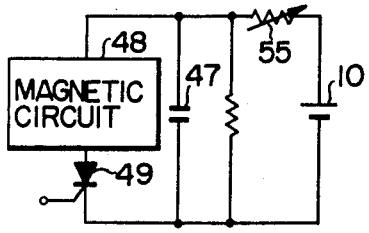

FIGS. 15b, 15c and 15d show other examples of the circuit for controlling the exposure time. In FIG. 15b, a d.c. voltage source is maintained constant but capacitors 50, 51, 52 of different capacitances are changed over through a change-over switch 53 to provide various exposure times.

In FIG. 15c, the voltage of a d.c. source is varied to vary the energy to be stored in a capacitor 47 and thereby to provide various exposure times. In FIT. 15d, although the voltage of a d.c. source is kept constant, the terminal voltage of a variable resistor 55, i.e., the charging voltage for a capacitor 47, is varied to provide various exposure times.

Figure 18:
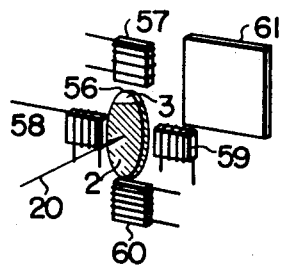
FIGS. 18, 19 and 20 show further embodiment.

FIG. 18 shows an embodiment in which the action of the magnetic fluid is made faster to improve the shutter function. In the FIGURE, a magnetic fluid 2 and a transparent material 3 is sealed in a transparent vessel 56, and electromagnetic coils 57, 58, 59 and 60 are provided around the transparent vessel 56. A photosensitive sheet 61 such as a photographic film is disposed behind the vessel 56. For controlling a light ray 20, the electromagnetic coils 57, 58, 59 and 60 are first energized to generate the magnetic fluxes of the polarity shown in the FIGURE. Then, the magnetic fluid 2 is attracted to the peripheral portion to transmit the light ray 20. Then, the currents to the coils 57, 58, and 60 are cut off by some switch means to pull back the magnetic fluid 2 to the light shielding position.

Figure 19:
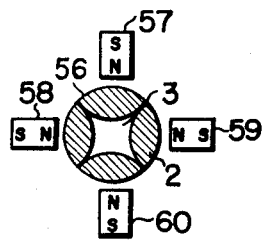
Figure 20:
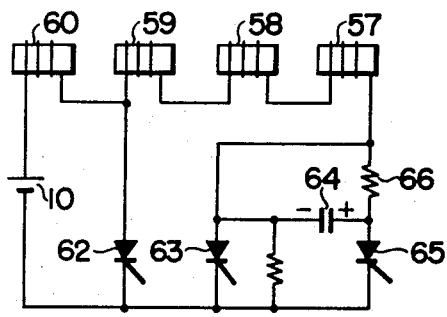

FIG. 20 shows a circuit for controlling said exposure. First, a controlling element 62 such as an SCR is turned off and then a controlling element 63 is turned on to allow a current to flow through the coils 57, 58, 59 and 60 from a d.c. source 10. Thus, the coils 57 to 60 are magnetized as is shown in FIG. 19. Then, a close signal is given from another unit to controlling elements 62 and 65 such as SCR's to turn on the elements 62 and 65. Then, the cotrolling element 63 such as an SCR is reversely biased and cut off. Thus, the current through the coils 57, 58, 59 is cut off and the magnetic flux disappears.

Here, a resistor 66 is provided for charging the capacitor 64 and has a value to keep the current below the holding current for the SCR 65. Upon disappearance of the magnetic flux in the coils 57, 58, 59, the magnetic fluid 2 moves to a light shielding position.

Here, since the controlling element 62 is kept to be turned on, the coil 60 keeps a magnetic flux. The gravity of the magnetic fluid 2 and the magnetic interaction with the flux of the coil 60 works additively so that the magnetic fluid 2 moves to the light shielding position swiftly.

Figure 21:
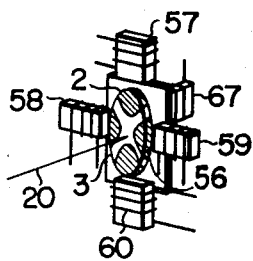
FIGS. 21 and 22 show yet further embodiment.

FIG. 21 shows another embodiment in which a sealed vessel 56 containing a magnetic fluid 2 and a transparent material 3 is provided with electromagnetic coils 57, 58, 59 and 60 for attracting the magnetic fluid to transmit a light ray 20 and an electromagnetic coil 67 for rapidly shifting the magnetic fluid 2.

Figure 22:
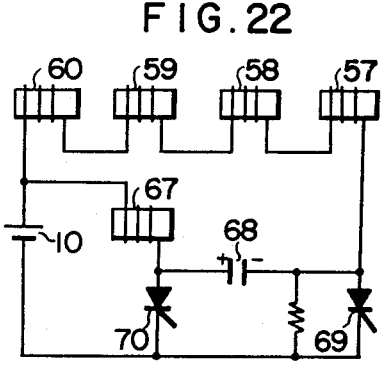

FIG. 22 shows an electric circuit for controlling the exposure in the device of FIG. 21. The current from a d.c. source 10 to the electromagnetic coils 57, 58, 59 and 60 is controlled by a controlling element 69. When these coils are energized, the magnetic fluid 2 is moved to bring the transparent material 3 to a central portion to transmit a light ray 20. Then, when an exposure close signal is given from a separate unit to a controlling element 70, the element 70 is turned on and the controlling element 69 is revesely biased by the energy stored in a capacitor 68 and cut off. Thus, the coils 57, 58, 59 and 60 lose the magnetic flux and the magnetic fluid 2 begins to move back to a light shielding position. Here, a current is allowed to flow through the electromagnetic coil 67 by the turn-on of the controlling element 70. The movement of the magnetic fluid 2 is enhanced by the magnetic flux generated by the coil 67.

In the foregoing description, the specific weight of the magnetic fluid was larger than that of the transparent liquid. The reverse case is also possible throughout the embodiments.

Further, the materials for the magnetic fluid and the transparent material described in the foregoing description are examples, only. Any material can be used provided that the magnetic fluid is a colloidal opaque fluid including an active magnetic material and the transparent material is a fluid being transparent in the required wavelength region.

We claim:

1. A light exposure controlling device, comprising:
   a sealed vessel containing a first colloidal magnetic fluid including an active magnetic material in suspension, and a second transparent fluid which is immiscible with said magnetic fluid, the volume ratio of said fluids corresponding to a desired area of transparency for transmitting electro-magnetic radiation through said vessel;
   magnetic field generating means coupled to said sealed vessel for generating a magnetic field to change the relative positions of said first and second fluids in said sealed vessel between transmitting and non-transmitting positions, said magnetic field generating means comprising core means, and an electro-magnetic coil wound around said core means, said core means having an opening through which electro-magnetic radiation passes and which is spatially located in correspondence with the location of said second fluid in its transmitting position to allow transmission through said vessel of said electro-magnetic radiation; and
   means for supplying electrical energy to said magnetic field generating said magnetic field to cause said first and second fluids to shift positions relative to each other and to permit transmission of said electro-magnetic radiation through said vessel.

2. The apparatus according to claim 1, further comprising an optical lens formed in one wall portion of said sealed vessel at a location corresponding to the location to which said second fluid is moved upon energizing said magnetic field generating means for transmitting said electro-magnetic radiation through said vessel.

3. A light exposure controlling device according to claim 1, wherein said core is split into a multiplicity of portions separated by a multiplicity of nonmagnetic members and each of the split portions is provided with an electromagnetic coil.

4. A light exposure controlling device according to claim 2, further comprising:
   a lens disposed in the neighborhood of said sealed vessel; and
   a photosensitive material disposed in the neighborhood of said sealed vessel.

5. A light exposure controlling device according to claim 1, wherein said power supply means includes a time setting circuit for setting the time for supplying the electric energy to said electromagnetic coil.

6. A light exposure control device according to claim 5, wherein said time setting circuit comprises a D.C. power source, a plurality of storage capacitors of different storage capacities, means for selectivity coupling said capacitors to said D.C. power source and to said magnetic field generating means, and a control element coupled to said magnetic field generating means for selectively opening and closing the conduction path between said magnetic field generating means and said power source and capacitors.

7. A light exposure controlling device according to claim 5, wherein said time setting circuit comprises a variable D.C. voltage source, a capacitor connected in parallel with said D.C. voltage source for supplying the electric energy to said electro-magnetic coil, and a controlling element for opening and closing the conduction path from said capacitor to said electromagnetic coil.

8. A light exposure controlling device according to claim 5, wherein said time setting circuit comprises a D.C. source, a voltage divider for dividing the voltages of said D.C. source and for supplying the divided voltages to said electromagnetic coil, and a control element for opening and closing the conduction path from said voltage divider to said electro-magnetic coil.

9. A light exposure controlling device according to claim 1, wherein a plurality of said magnetic field generating means is disposed to surround said sealed vessel.

10. A light exposure device according to claim 9, further comprising means for varying the distribution of the magnetic field applied to said sealed vessel for rapidly moving said magnetic fluid to the non-transmitting state.

11. A light exposure device according to claim 9, further comprising a secondary magnetic field generating means coupled to said sealed vessel in addition to a plurality of primary ones of said magnetic field generating meand disposed to surround said sealed vessel, for rapidly moving the magnetic fluid to the non-transmitting position.

12. A light exposure controlling device, comprising:
   a sealed vessel containing a first colloidal magnetic fluid including an active magnetic material in suspension, and a second transparent fluid which is immiscible with said magnetic fluid, the volume ratio of said fluids corresponding to a desired area of transparency for transmitting electro-magnetic radiation through said vessel;
   magnetic field generating means coupled to said sealed vessel for generating a magnetic field to change the relative positions of said first and second fluids in said sealed vessel between transmitting and non-transmitting positions, said magnetic field generating means comprising an electro-magnetic coil wound around said sealed vessel; and
   means for supplying electrical energy to said magnetic field generating means to generate said magnetic field to cause said first and second fluids to shift positions relative to each other and to permit transmission of said electro-magnetic radiation through said vessel.

13. The apparatus according to claim 12, further comprising an optical lens formed in one wall portion of said sealed vessel at a location corresponding to the location to which said second fluid is moved upon energizing said magnetic field generating means for transmitting said electro-magnetic radiation through said vessel.

14. The apparatus according to claim 12, wherein said coil comprises a plurality of intermediate taps; the apparatus further comprising means for selectively coupling said supply means to said taps to thereby control the magnetic field distribution in said vessel to selectively displace said first fluid in correspondence with the field distribution to control the area of transparency for the transmission of electro-magnetic radiation through said vessel.

15. A light exposure controlling device according to claim 12, wherein said power supply means includes a time setting circuit for setting the time for supplying the electric energy to said electromagnetic coil.

16. A light exposure control device according to claim 15, wherein said time setting circuit comprises a D.C. power source, a plurality of storage capacitors of different storage capacities, means for selectively coupling said capacitors to said D.C. power source and to said magnetic field generating means, and a control element coupled to said magnetic field generating means for selectively opening and closing the conduction path between said magnetic field generating means and said power source and capacitors.

17. A light exposure controlling device according to claim 15, wherein said time setting circuit comprises a variable D.C. voltage source, a capacitor connected in parallel with said D.C. voltage source for supplying the electric energy to said electro-magnetic coil, and a controlling element for opening and closing the conduction path from said capacitor to said electromagnetic coil.

18. a light exposure controlling device according to claim 15, wherein said time setting circuit comprises a D.C. source, a voltage divider for dividing the voltage of said D.C. source and for supplying the divided voltages to said electromagnetic coil, and a control element for opening and closing the conduction path from said voltage divider to said electro-magnetic coil.

* * * * *